United States Patent
Hikazudani et al.

(10) Patent No.: US 9,341,111 B2
(45) Date of Patent: May 17, 2016

(54) AMMONIA-ENGINE SYSTEM

(75) Inventors: Susumu Hikazudani, Osaka (JP);
Chikashi Inazumi, Osaka (JP);
Haruyuki Nakanishi, Toyota (JP);
Norihiko Nakamura, Toyota (JP);
Hidekazu Arikawa, Toyota (JP)

(73) Assignees: HITACHI ZOSEN CORPORATION, Osaka-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 294 days.

(21) Appl. No.: 13/130,201

(22) PCT Filed: Nov. 19, 2009

(86) PCT No.: PCT/JP2009/069601
§ 371 (c)(1),
(2), (4) Date: Aug. 1, 2011

(87) PCT Pub. No.: WO2010/058807
PCT Pub. Date: May 27, 2010

(65) Prior Publication Data
US 2011/0283960 A1 Nov. 24, 2011

(30) Foreign Application Priority Data
Nov. 19, 2008 (JP) ................................. 2008-295476

(51) Int. Cl.
*F02B 43/08* (2006.01)
*F02D 41/14* (2006.01)
(Continued)

(52) U.S. Cl.
CPC ............ *F02B 43/10* (2013.01); *B01D 53/9436* (2013.01); *B01J 23/42* (2013.01);
(Continued)

(58) Field of Classification Search
USPC ..................................................... 123/3, 443
See application file for complete search history.

(56) References Cited

U.S. PATENT DOCUMENTS 4,774,065 A * 9/1988 Penzhorn et al. ............. 423/210
5,976,723 A * 11/1999 Boffito et al. ................. 429/410
(Continued)

FOREIGN PATENT DOCUMENTS

| JP | 05 332152 | 12/1993 |
|---|---|---|
| JP | 5 332152 | 12/1993 |

(Continued)

OTHER PUBLICATIONS

International Search Report issued Dec. 22, 2009 in PCT/JP09/069601 filed Nov. 19, 2009.
(Continued)

*Primary Examiner* — Lindsay Low
*Assistant Examiner* — Syed O Hasan
(74) *Attorney, Agent, or Firm* — Oblon, McClelland, Maier & Neustadt, L.L.P.

(57) ABSTRACT

An ammonia-engine system is capable of supplying an ammonia cracking catalyst with a temperature necessary to promote a reaction even during low load operation in which a temperature of an exhaust gas from an ammonia engine is lower than an operating temperature of the ammonia cracking catalyst. In an ammonia-engine system provided with an ammonia engine (2) using ammonia as fuel and an ammonia cracking device (5) including an ammonia cracking catalyst that cracks ammonia and cracking ammonia to produce hydrogen, an ammonia oxidizing device (4) is provided between the ammonia engine (2) and the ammonia cracking device (5).

21 Claims, 1 Drawing Sheet

(51) Int. Cl.
  *B01J 8/04* (2006.01)
  *F02B 43/10* (2006.01)
  *B01D 53/94* (2006.01)
  *B01J 23/42* (2006.01)
  *B01J 23/46* (2006.01)
  *B01J 23/58* (2006.01)
  *B01J 23/74* (2006.01)
  *B01J 35/04* (2006.01)
  *C01B 3/04* (2006.01)
  *F02M 25/12* (2006.01)

(52) U.S. Cl.
  CPC ............. *B01J 23/46* (2013.01); *B01J 23/58* (2013.01); *B01J 23/74* (2013.01); *B01J 35/04* (2013.01); *C01B 3/047* (2013.01); *F02M 25/12* (2013.01); *B01D 2255/1025* (2013.01); *B01D 2255/1026* (2013.01); *B01D 2255/20738* (2013.01); *B01D 2255/20753* (2013.01); *Y02E 60/364* (2013.01); *Y02T 10/121* (2013.01); *Y02T 10/32* (2013.01)

(56) References Cited

U.S. PATENT DOCUMENTS

| | | | |
|---|---|---|---|
| 6,030,594 A * | 2/2000 | Ward | 423/403 |
| 8,272,353 B2 * | 9/2012 | Dincer et al. | 123/3 |
| 8,377,402 B2 * | 2/2013 | Rameshni | 423/237 |
| 2001/0018035 A1 * | 8/2001 | Graville | 423/237 |
| 2002/0028171 A1 * | 3/2002 | Goetsch et al. | 423/237 |
| 2004/0154223 A1 | 8/2004 | Powell et al. | |
| 2005/0037244 A1 | 2/2005 | Goetsch et al. | |
| 2005/0281735 A1 | 12/2005 | Chellappa et al. | |
| 2006/0112636 A1 | 6/2006 | Chellappa et al. | |
| 2012/0040261 A1 * | 2/2012 | Nakanishi et al. | 429/416 |

FOREIGN PATENT DOCUMENTS

| | | |
|---|---|---|
| JP | 2004 195454 | 7/2004 |
| JP | 2004 525058 | 8/2004 |
| JP | 2008 088922 | 4/2008 |
| JP | 2008 88922 | 4/2008 |
| WO | WO 2010/116874 | 10/2010 |

OTHER PUBLICATIONS

Extended European Search Report dated Oct. 28, 2013, received in corresponding EP Application No. EP 09082 7588.

* cited by examiner

AMMONIA-ENGINE SYSTEM

TECHNICAL FIELD

The present invention relates to an ammonia-engine system provided with an ammonia engine using ammonia as fuel and an ammonia cracking device including an ammonia cracking catalyst that cracks ammonia and cracking ammonia to produce hydrogen.

BACKGROUND ART

There has been an ammonia engine using ammonia as fuel. Because the ammonia engine has a characteristic that ignition performance is poor, combustion of ammonia becomes insufficient during low load operation and high load operation of the engine. It is therefore necessary for the ammonia engine to add a combustion improver to promote combustion of ammonia. Hydrocarbon fuel and hydrogen are available as the combustion improver. Ammonia is a compound of hydrogen atoms and a nitrogen atom and it is possible to produce hydrogen by chemically cracking ammonia. The ammonia engine is therefore thought to be the most desirable system in that the engine can be driven by ammonia alone by using hydrogen produced by cracking ammonia as the combustion improver.

A reaction to produce hydrogen and nitrogen from ammonia with an ammonia cracking catalyst is an endothermic reaction. In order to allow this reaction to progress, it is necessary to bring the ammonia cracking catalyst into contact with ammonia while conferring a temperature of 290° C. or above (preferably 340° C. or above) to the ammonia cracking catalyst.

Patent Document 1 discloses an ammonia combustion engine configured to supply ammonia cracking means with an exhaust gas after combustion of ammonia in the ammonia combustion engine.

This ammonia combustion engine promotes a cracking reaction of ammonia by utilizing the fact that an ammonia-containing exhaust gas becomes hot due to combustion in the ammonia combustion engine.

In this device, however, the temperature of the ammonia cracking catalyst depends on the temperature of the exhaust gas. Accordingly, combustion efficiency of ammonia in the ammonia engine is poor during low load operation (engine start-up) and a hot exhaust gas is not supplied to the ammonia cracking catalyst. Hence, a reaction to produce hydrogen and nitrogen from ammonia progresses poorly. Consequently, hydrogen serving as a combustion improver to promote the driving of the engine is not supplied to the ammonia combustion engine in a low load operating condition. It therefore takes a long time for the ammonia engine to come out of the low load operating condition.

Patent Document 1: JP-A-5-332152

DISCLOSURE OF THE INVENTION

Problems to be Solved by the Invention

The invention was devised in view of the foregoing and has an object to provide an ammonia-engine system capable of supplying an ammonia cracking catalyst with a temperature necessary to promote a reaction even during low load operation in which the temperature of an exhaust gas from an ammonia engine is lower than an operating temperature of the ammonia cracking catalyst.

Means for Solving the Problems

As has been described above, in order to stably produce hydrogen from ammonia using the ammonia cracking catalyst, it is necessary to maintain the ammonia cracking catalyst at 290° C. or above (preferably at 340° C. or above). To this end, the inventors conducted an assiduous study and discovered that because ammonia produces heat when it undergoes an oxidation reaction with oxygen as expressed by Formula (1) below, the problems described above can be solved by incorporating an ammonia oxidizing device giving rise to such an exothermal reaction between the ammonia engine and the ammonia cracking device.

$$NH_3 + 3/4 O_2 \rightarrow 1/2 N_2 + 3/2 H_2O \quad (1),$$

More specifically, an ammonia-engine system of the invention is provided with an ammonia engine using ammonia as fuel and an ammonia cracking device including an ammonia cracking catalyst that cracks ammonia and cracking ammonia to produce hydrogen, wherein an ammonia oxidizing device is provided between the ammonia engine and the ammonia cracking device.

The ammonia oxidizing device can be any device as long as it is capable of giving rise to the reaction expressed by Formula (1) above and a platinum-supported catalyst is suitably used as the ammonia oxidation catalyst. In this case, the operating temperature of the catalyst is 150° C. or above. Because the temperature of an exhaust gas from the engine is normally 150° C. or above even when the ammonia-engine is operating at a low load, the temperature of the exhaust gas is sufficiently high to allow the ammonia oxidation reaction expressed by Formula (1) above to progress. It is therefore possible to supply sufficient heat for the ammonia cracking catalyst in the ammonia cracking device to reach a temperature of 290° C. or above (preferably 340° C. or above) from the ammonia oxidizing device. An amount of ammonia contained in the exhaust gas from the ammonia engine is controlled by adjusting a flow rate of gas to be supplied to the ammonia oxidizing device. It thus becomes possible to control a heat value produced in the ammonia oxidizing device.

The platinum-supported catalyst can have any shape and the one having, for example, a monolithic shape is available.

There is a case where the temperature of the exhaust gas is 150° C. or below at the start-up of the engine. In such a case, because the exhaust gas has not reached the operating temperature of the catalyst, the platinum-support catalyst is not able to function to achieve Formula (1). In this case, it is advantageous to further provide a heater to, for example, a pipe between the outlet of the ammonia engine and the ammonia oxidizing device. When configured in this manner, even when the exhaust gas from the engine has not reached 150° C. at the start-up of the engine, it becomes possible to provide the ammonia oxidizing device with a necessary heat value by actuating the heater until the temperature of the exhaust gas reaches 150° C. The internal temperature of the ammonia oxidizing device is therefore maintained in a stable manner from the start-up of the engine. Consequently, hydrogen can be produced in a stable manner in the ammonia cracking device and the engine is enabled to operate in a stable manner.

The ammonia cracking device can have any structure and, for example, it may have a structure of a plate-type heat exchanger. In a case where the ammonia cracking device has the structure of the plate-type heat exchanger, it is preferable that the ammonia cracking catalyst is filled in the ammonia cracking device on an ammonia supply side or the catalyst is coated on the surface of a material on the ammonia supply side.

The ammonia cracking catalyst in the ammonia cracking device can be, for example, a catalyst supporting ruthenium, rhodium, nickel, and/or iron.

In the ammonia-engine system of the invention, an inlet temperature on an exhaust gas introduction side of the ammonia cracking device is maintained at 290° C. or above (preferably at 340° C. or above) and an inlet temperature of the ammonia oxidizing device is maintained at 150° C. or above.

Also, in the ammonia-engine system of the invention, in a case where the inlet temperature on the exhaust gas introduction side of the ammonia cracking device is 300° C. or below, an ammonia gas is further added to the exhaust gas from the ammonia engine. Further, the ammonia gas may be added also in a case where an ammonia concentration of the exhaust gas from the ammonia engine is 3% or less.

Moreover, in the ammonia-engine system of the invention, only in a case where the inlet temperature of the ammonia oxidizing device is 150° C. or below, ammonia to be supplied to the ammonia oxidizing device is heated by the heater.

Advantageous Effects of the Invention

According to the ammonia-engine system of the invention, because the ammonia oxidizing device is provided between the ammonia engine and the ammonia cracking device, in a case where the temperature of the exhaust gas from the ammonia engine is lower than the operating temperature of the ammonia cracking catalyst in the ammonia cracking device, it is possible to raise the temperature of the exhaust gas with oxidation heat produced by the oxidation reaction of ammonia. It thus becomes possible to maintain the temperature of the ammonia cracking catalyst at or above the operating temperature thereof even during low load operation in which the temperature of the exhaust gas from the ammonia engine is low. The ammonia engine is thus enabled to operate in a stable manner.

BEST MODE FOR CARRYING OUT THE INVENTION

Hereinafter, an ammonia-engine system of the invention will be described in detail on the basis of the drawings.

FIG. 1 is a flow sheet showing the ammonia-engine system of the invention.

An ammonia engine (2) is an engine that uses ammonia supplied from an $NH_3$ tank (1) as fuel and is driven by combustion of ammonia.

An exhaust gas from the ammonia engine (2) is supplied to an ammonia oxidizing device (4). The exhaust gas from the ammonia engine (2) may be supplied directly to the ammonia oxidizing device (4) or may alternatively be passed through a line heater (3) before it is supplied to the ammonia oxidizing device (4). Whether the line heater (3) is driven to heat the exhaust gas or not depends on the temperature of the exhaust gas. More specifically, the line heater (3) is an optional component in the invention. Because a combustion reaction of ammonia in the ammonia engine (2) is an exothermic reaction, the exhaust gas from the ammonia engine (2) has a temperature of 150° C. or above when the ammonia engine (2) is driven normally. However, the exothermic reaction does not progress sufficiently in the ammonia engine (2) at the start-up of the ammonia engine (2). Accordingly, there is a case where the temperature of the exhaust gas does not reach 150° C. When the temperature of the exhaust gas does not reach 150° C., an oxidation reaction of ammonia in the ammonia oxidizing device (4) does not progress sufficiently. In such a case, the line heater (3) is driven in an auxiliary manner for the exhaust gas to have a temperature of 150° C. or above.

The ammonia oxidizing device (4) has a platinum-supported catalyst as an ammonia oxidation catalyst. The platinum-supported catalyst has, for example, a monolithic shape. An operating temperature of the platinum-supported catalyst is 150° C. and oxidation of ammonia progresses because the exhaust gas supplied directly from the ammonia engine (2) or supplied after it is heated in the line heater (3) has a temperature of 150° C. or above.

An oxidation reaction of ammonia in the ammonia oxidizing device (4) is an exothermic reaction and a gas in the ammonia oxidizing device (4) reaches 290° C. or above (preferably 340° C. or above) due to this exothermic reaction. The gas having reached 290° C. or above (preferably 340° C. or above) in this manner is supplied to an exhaust gas introduction side of an ammonia cracking device (5).

The ammonia cracking device (5) has, for example, the structure of a plate-type heat exchanger. Also, as a catalyst to crack ammonia, it has, for example, a ruthenium-supported catalyst. The ammonia cracking catalyst is filled in the ammonia cracking device (5) on an ammonia supply side or coated on a material surface on the ammonia supply side.

To the exhaust gas introduction side of the ammonia cracking device (5), a gas at 290° C. or above (preferably at 340° C. or above) is supplied from the ammonia oxidizing device (4) and ammonia is supplied from the $NH_3$ tank (1) to the ammonia supply side. Inside the ammonia cracking device (5), the temperatures of the ammonia gas supplied therein and the ammonia cracking catalyst increase due to heat exchange between the exhaust gas and the ammonia gas, and ammonia supplied from the $NH_3$ tank (1) cracks to hydrogen and nitrogen by a catalytic action of the ammonia cracking catalyst. A hydrogen-containing ammonia-cracked gas thus produced is supplied to the ammonia engine (2) as a combustion improver for the ammonia engine (2).

Concrete advantageous effects of the invention have been confirmed by examples, which will be described below.

EXAMPLE 1

In order to schematically demonstrate advantages of the invention, driving of the ammonia oxidizing device (4) and the ammonia cracking device (5) was tested using a system configured as is shown in FIG. 2. The system shown in FIG. 2 imitates the ammonia-engine system of FIG. 1. An air heater (6) into which heated air is provided instead of the ammonia engine (2) and ammonia is supplied to the line heater (3) from the $NH_3$ tank (1). Thermocouples to measure a heat value are provided to the ammonia oxidizing device (4) on an inlet side and an outlet side and to the ammonia cracking device on an $NH_3$ gas introduction side and an introduction side of gas from the ammonia oxidizing device (4). The same components are labeled with the same reference numerals with respect to FIG. 1 and a detailed description of such components is omitted herein.

In the test of Example 1, heated air was used as a simulant gas of the exhaust gas from the ammonia engine. Also, a honeycomb-shaped platinum catalyst (obtained by coating a cordierite honeycomb substrate with a platinum-supported $Al_2O_3$ catalyst, an amount of supported platinum: 2 g/L) was used as the ammonia oxidation catalyst that the ammonia oxidizing device (4) has. A ruthenium catalyst in a pellet form (having a diameter of 1 mmφ) (support: activated carbon with the use of a Ba compound as a promoter, amount of supported Ru: 5 wt %) was used as the ammonia cracking catalyst that the ammonia cracking device (5) has. The ammonia cracking catalyst was filled in the ammonia cracking device (5) on the ammonia supply side.

A gas flow rate of the heated air was set to 10 NL/min and the temperature was raised from room temperature to 250° C. An amount of ammonia directly supplied to the ammonia cracking device (5) was adjusted to be 0.5 NL/min. The catalyst in each device was activated while varying an amount of ammonia supplied to the ammonia oxidizing device (4) and an ammonia cracking rate in the ammonia cracking device (5) was measured. The line heater (3) was not driven in Example 1.

EXAMPLE 2

A test was conducted in the same manner as in Example 1 above except that the line heater (3) was driven.

COMPARATIVE EXAMPLE 1

A test was conducted in the same manner as in Example 1 above except that ammonia was not supplied to the ammonia oxidizing device.

The test result of Example 1 is set forth in Table 1 below, the test result of Example 2 in Table 2 below, and the test result of Comparative Example 1 in Table 3 below.

TABLE 1

| Temperature of Heated Air (° C.) | Ammonia Oxidizing Device | | | Ammonia Cracking Device | | |
|---|---|---|---|---|---|---|
| | Amount of Supplied Ammonia (NL/min) | Inlet Temperature (° C.) | Outlet Temperature (° C.) | Inlet Temperature on Exhaust Gas Introduction Side (° C.) | Inlet Temperature of Cracking Catalyst (° C.) | Ammonia Cracking Rate (%) |
| 25 | 0.1 | 25 | 25 | 25 | 25 | 0 |
| 105 | 0.1 | 95 | 95 | 90 | 85 | 0 |
| 155 | 0.1 | 150 | 250 | 245 | 240 | 0 |
| 155 | 0.2 | 150 | 350 | 345 | 340 | 100 |
| 205 | 0.1 | 200 | 300 | 295 | 290 | 85 |
| 205 | 0.15 | 200 | 350 | 345 | 340 | 100 |
| 255 | 0.05 | 250 | 300 | 295 | 290 | 85 |
| 255 | 0.1 | 250 | 350 | 345 | 340 | 100 |

TABLE 2

| Temperature of Heated Air (° C.) | Ammonia Oxidizing Device | | | Ammonia Cracking Device | | |
|---|---|---|---|---|---|---|
| | Amount of Supplied Ammonia (NL/min) | Inlet Temperature (° C.) | Outlet Temperature (° C.) | Inlet Temperature on Exhaust Gas Introduction Side (° C.) | Inlet Temperature of Cracking Catalyst (° C.) | Ammonia Cracking Rate (%) |
| 25 | 0.1 | 150 | 250 | 245 | 240 | 0 |
| 25 | 0.2 | 150 | 350 | 345 | 340 | 100 |

TABLE 3

| Temperature of Heated Air (° C.) | Ammonia Oxidizing Device | | | Ammonia Cracking Device | | |
|---|---|---|---|---|---|---|
| | Amount of Supplied Ammonia (NL/min) | Inlet Temperature (° C.) | Outlet Temperature (° C.) | Inlet Temperature on Exhaust Gas Introduction Side (° C.) | Inlet Temperature of Cracking Catalyst (° C.) | Ammonia Cracking Rate (%) |
| 155 | 0 | 150 | 145 | 140 | 135 | 0 |
| 205 | 0 | 200 | 195 | 190 | 185 | 0 |
| 25 | 0 | 150 | 145 | 140 | 135 | 0 |

As are shown in Tables 1 through 3 above, it was found that in a case where the inlet temperature of the ammonia oxidizing device (4) is 150° C. or above, it is possible to raise the temperature of the gas with oxidation heat produced by the ammonia oxidation reaction by supplying ammonia to the ammonia oxidizing device (4) and that in a case where the temperature of the ammonia cracking device (5) on the ammonia supply side is 340° C. or above, ammonia cracks at the cracking rate of 100% to produce hydrogen in the ammonia cracking device (5).

Also, it was found that in a case where the temperature of the heated air is 150° C. or below, by further raising the temperature of the heated air by actuating the line heater (3) and thereby raising the inlet temperature of the ammonia oxidizing device (4) to 150° C. or above, the oxidation reaction in the ammonia oxidizing device (4) is promoted and the temperature of the gas in the ammonia oxidizing device (4) consequently rises, which makes it possible to produce hydrogen by activating the ammonia cracking catalyst in the ammonia cracking device (5). Hence, it is found that even in a case where the temperature of the exhaust gas is low, it is possible to produce hydrogen in the ammonia cracking device (5) by actuating the line heater (3).

Further, it is found that production of heat in the ammonia oxidizing device (4) can be increased to over 340° C. by adjusting an amount of ammonia to be supplied to the ammonia oxidizing device (4), which makes it possible to promote cracking of ammonia in the ammonia cracking device.

EXPLANATION OF REFERENCE NUMERALS AND SIGNS IN THE DRAWINGS

Figure 1:
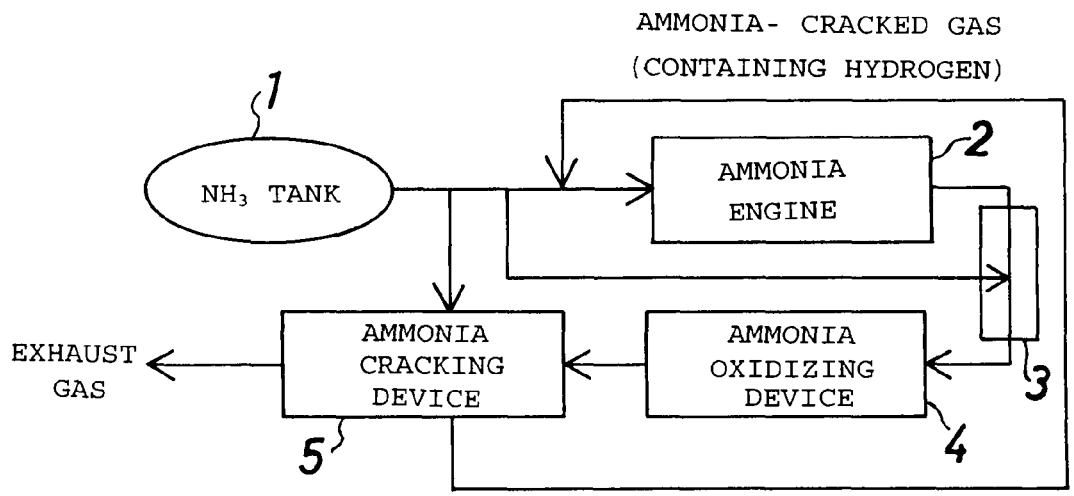
FIG. 1 is a flow sheet showing an ammonia-engine system of the invention.
Figure 2:
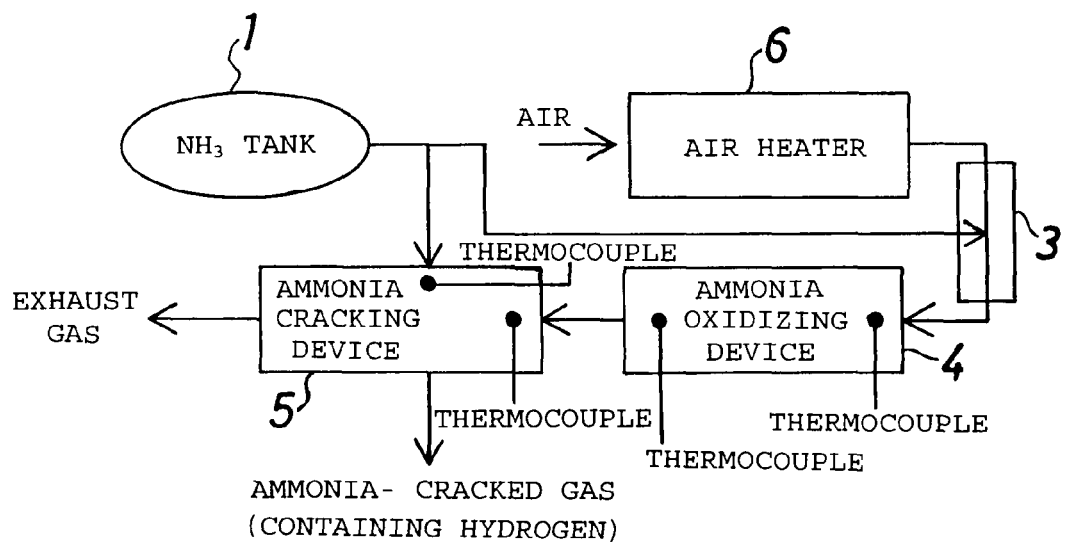
FIG. 2 is a flow sheet showing the configuration of an ammonia oxidizing device (4) and an ammonia cracking device (5) used in examples to schematically demonstrate advantageous effects of the invention.

1: NH₃ tank
2: ammonia engine
3: line heater
4: ammonia oxidizing device
5: ammonia cracking device

The invention claimed is:

1. An ammonia-engine system, comprising:
an ammonia engine employing ammonia supplied from a NH₃ tank directly used as fuel;
an ammonia cracking device comprising an ammonia cracking catalyst that cracks ammonia from the NH₃ tank to produce hydrogen,
  wherein the temperature of the ammonia supplied therein and the ammonia cracking catalyst increase due to heat exchange between the exhaust gas from the ammonia engine and the ammonia,
  wherein the hydrogen-containing ammonia-cracked gas produced in the ammonia cracking device is supplied to the ammonia engine as a combustion improver for the ammonia engine; and
an ammonia oxidizing device, provided between the ammonia engine and the exhaust gas introduction side of the ammonia cracking device, to provide heat to the ammonia cracking device at start-up of the ammonia engine by oxidizing ammonia according to the following formula:

$$NH_3 + 3/4 O_2 \rightarrow 1/2 N_2 + 3/2 H_2O \quad (1),$$

wherein the heat provided by the ammonia is sufficient to heat the ammonia cracking catalyst in the ammonia cracking device to a temperature of 290° C. or greater.

2. The system of claim 1, wherein:
the ammonia oxidizing device comprises a platinum-supported catalyst.

3. The system of claim 2, wherein:
the platinum-supported catalyst has a monolithic shape.

4. The system of claim 1, further comprising:
a heater, provided between an outlet of the ammonia engine and an inlet of the ammonia oxidizing device, wherein the heater heats ammonia only when an inlet temperature of the ammonia oxidizing device is 150° C. or below.

5. The system of claim 1, wherein:
the ammonia cracking device has a structure of a plate heat exchanger.

6. The system of claim 5, wherein:
the ammonia cracking catalyst is filled in the ammonia cracking device on an ammonia supply side or the catalyst is coated on a surface of a material on the ammonia supply side of the ammonia cracking device.

7. The system of claim 6, wherein:
the ammonia cracking catalyst comprises a catalyst supporting at least one selected from the group consisting of ruthenium, rhodium, nickel, and iron.

8. The system of claim 1, wherein:
an inlet temperature on an exhaust gas introduction side of the ammonia cracking device is maintained at 290° C. or above.

9. The system of claim 1, wherein:
an inlet temperature of the ammonia oxidizing device is maintained at 150° C. or above.

10. The system of claim 1, wherein:
an ammonia gas is further added to the exhaust gas from the ammonia engine in a case where an inlet temperature on an exhaust gas introduction side of the ammonia cracking device is 300° C. or below.

11. The system of claim 10, wherein:
the ammonia gas is added also in a case where an ammonia concentration of the exhaust gas from the ammonia engine is 3% or less.

12. The system of claim 4, wherein:
ammonia to be supplied to the ammonia oxidizing device is heated by a heater only in a case where the inlet temperature of the ammonia oxidizing device is 150° C. or below.

13. The system of claim 2, further comprising:
a heater, provided between an outlet of the ammonia engine and the ammonia oxidizing device.

14. The system of claim 3, further comprising:
a heater, provided between an outlet of the ammonia engine and the ammonia oxidizing device.

15. The system of claim 2, wherein, the ammonia cracking device has a structure of a plate heat exchanger.

16. The system of claim 3, wherein the ammonia cracking device has a structure of a plate heat exchanger.

17. The system of claim 4, wherein, the ammonia cracking device has a structure of a plate heat exchanger.

18. The system of claim 15, wherein the ammonia cracking catalyst is filled in the ammonia cracking device on an ammonia supply side or the catalyst is coated on a surface of a material on the ammonia supply side of the ammonia cracking device.

19. The system of claim 16, wherein the ammonia cracking catalyst is filled in the ammonia cracking device on an ammonia supply side or the catalyst is coated on a surface of a material on the ammonia supply side of the ammonia cracking device.

20. The system of claim 17, wherein the ammonia cracking catalyst is filled in the ammonia cracking device on an ammonia supply side or the catalyst is coated on a surface of a material on the ammonia supply side of the ammonia cracking device.

21. The system of claim 1, wherein the ammonia oxidizing device is downstream of the ammonia engine.

* * * * *